Dec. 24, 1963
A. CARUSI
3,114,921
METHOD OF MAKING TUBULAR RIVETS
Original Filed Feb. 6, 1956
2 Sheets-Sheet 1
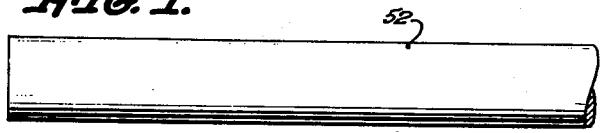
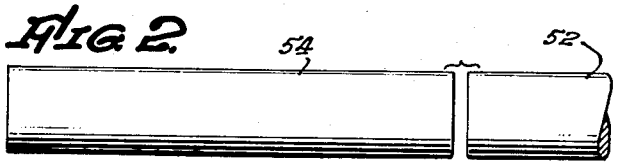
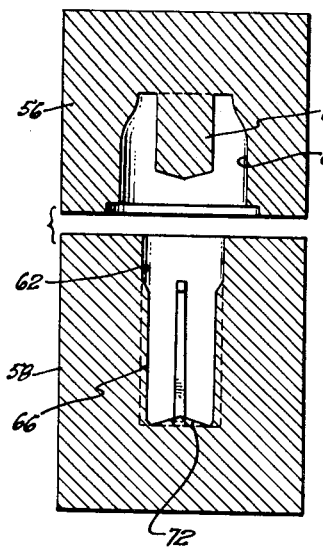
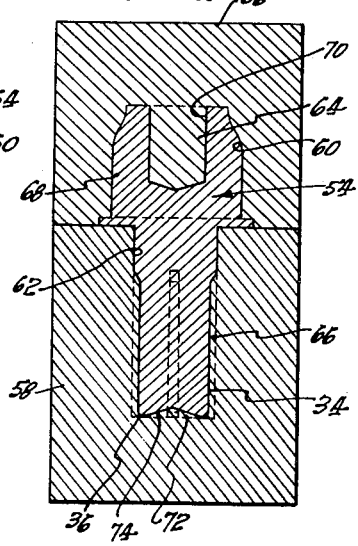
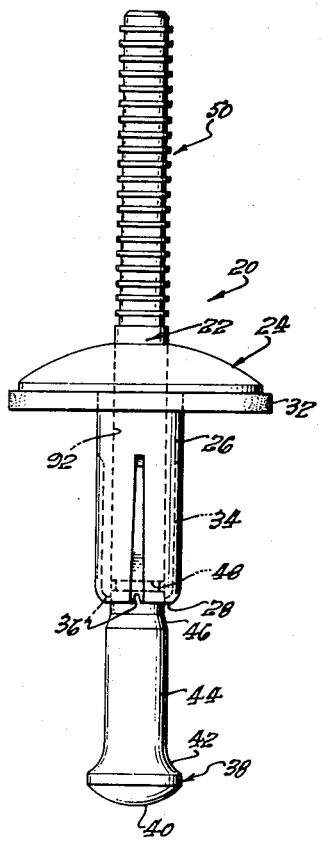
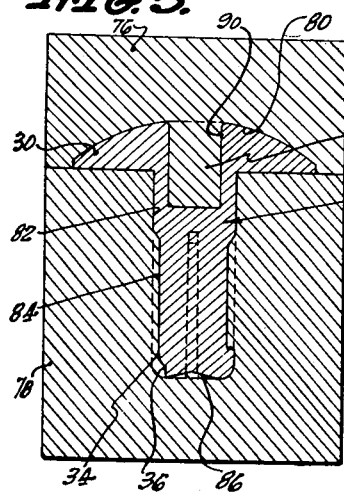
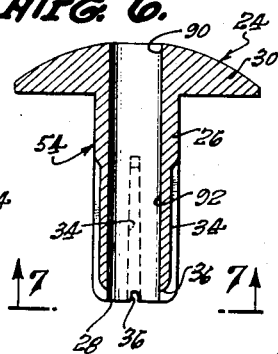
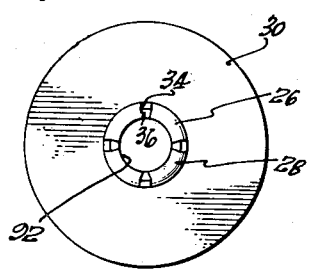
ALEXANDER CARUSI,
INVENTOR.
By His Attorneys.
HARRIS, KIECH, FOSTER & HARRIS.

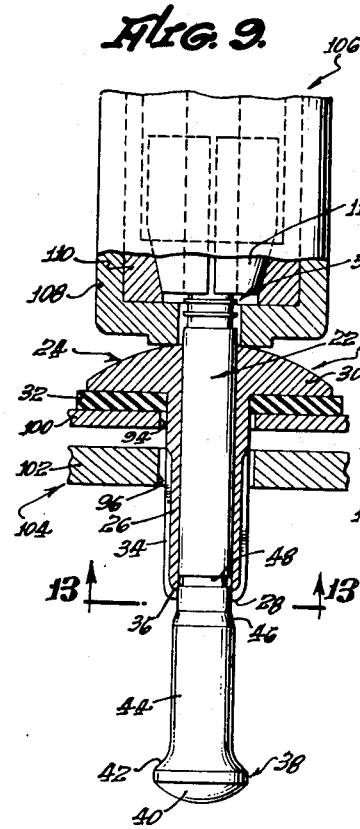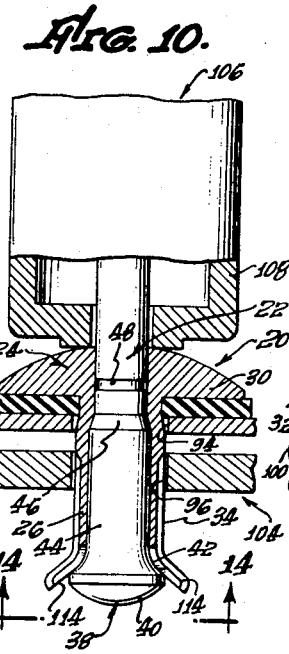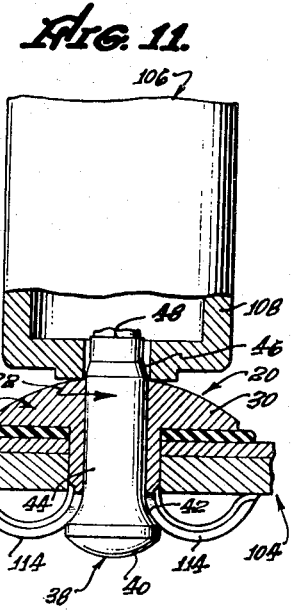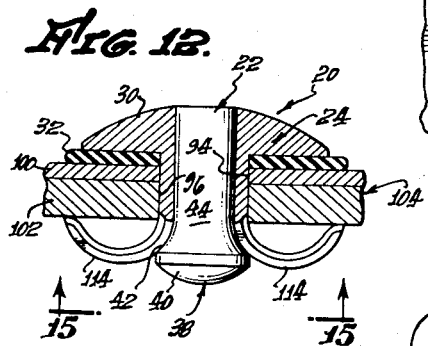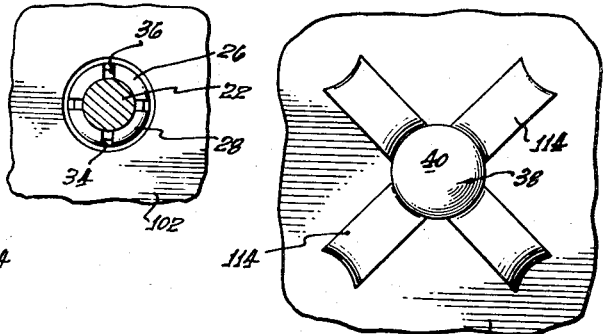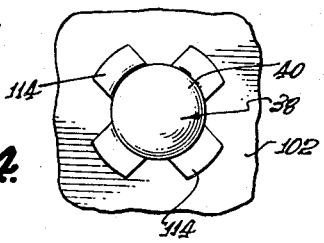

United States Patent Office 3,114,921
Patented Dec. 24, 1963

3,114,921
METHOD OF MAKING TUBULAR RIVETS
Alexander Carusi, Downey, Calif., assignor to Olympic Screw & Rivet Corporation, Downey, Calif., a corporation
Original application Feb. 6, 1956, Ser. No. 563,485. Divided and this application May 11, 1959, Ser. No. 812,487
2 Claims. (Cl. 10—27)

This application is a division of my co-pending application Serial No. 563,485, filed February 6, 1956.

The present invention relates in general to a blind rivet assembly and, more particularly, to a method of manufacturing a tubular rivet which forms part of a blind rivet assembly capable of producing high clinching forces when set.

As general background, a blind rivet assembly of the type to which the present invention relates comprises a stem having thereon a tubular rivet which includes a sleeve having a head at one end and a tail at its other end, the stem being provided at one end thereof with tail flaring means adjacent and engageable with the tail of the tubular rivet and being provided with grippable means at the other end thereof. Preferably, the stem is provided with an enlarged shank adjacent the tail flaring means and is provided with a weakened zone intermediate such shank and the grippable means.

In setting a rivet assembly of the foregoing general type, the assembly is inserted through registering holes in elements to be riveted together so that the tail of the tubular rivet and the tail flaring means on the stem are on one side of such elements and the head of the tubular rivet and the grippable means are on the opposite side thereof. A riveting tool having pressure and pulling members is then applied to the rivet assembly with the pressure member seated against the head of the tubular rivet and with the pulling member in engagement with the grippable means on the stem. The pulling member is then moved axially of the pressure member to draw the enlarged shank of the stem into the sleeve of the tubular rivet so as to expand the sleeve into engagement with the elements to be riveted together, and to draw the tail flaring means on the stem into tail flaring engagement with the tail of the tubular rivet, thereby clamping the elements which are to be riveted together between the head of the tubular rivet and the flared tail thereof. Eventually, the stem of the rivet assembly is broken off at the weakened zone therein and any excess portions of the stem may be trimmed off flush with the head of the tubular rivet.

In accordance with the present invention, the external surface of the sleeve of the tubular rivet is longitudinally grooved or fissured from the tail of such sleeve toward the head thereof so that, as the tail flaring means on the stem is drawn into the sleeve, the sleeve is split longitudinally into a plurality of prongs which engage one side of the assembly of elements to be riveted together, the head on the tubular rivet engaging the opposite side thereof. The tail of the tubular rivet may be provided with transverse notches extending from the internal surface of the sleeve to the external surface thereof and communicating with the longitudinal grooves or fissures in the external surface of the sleeve. These notches facilitate initiation of the splitting of the sleeve along the longitudinal fissures in the external surface thereof, which is an important feature.

An important object of the invention is to provide a method of making the tubular rivet in such a manner that the prongs resulting from splitting of the sleeve inherently tend to curl outwardly as the sleeve is split.

Another object is to provide a method of making the tubular rivet in such a way that the density of the material forming the sleeve increases toward the internal surface thereof so that, as the sleeve is divided into prongs, these prongs tend to curl outwardly as the stresses therein resulting from the non-uniform density are relieved.

Another object of the invention is to provide a method of forming a tubular rivet of the foregoing nature from a solid bar of material which includes the steps of upsetting one end of the bar to form the head of the rivet, compacting a central zone of the bar axially of the bar from both ends of the bar, and subsequently drilling an axial bore through the bar to form the sleeve of the tubular rivet, such method also including the step of providing the external surface of the bar with longitudinal fissures which extend from said other end thereof in a direction toward said one end thereof and which permit splitting of the sleeve into prongs upon drawing of the tail flaring means on the stem into the sleeve.

More particularly, an object of the invention is to provide a method wherein the step of compacting the central zone of the bar of which the tubular rivet is formed includes simultaneous center punching of both ends of the bar in a direction axially of the bar, this being done simultaneously with the upsetting of one end of the bar to form the rivet head and being done after forming the external longitudinal fissures. Subsequently, an axial bore is drilled through the bar from the bottom of one of the recesses formed by the center punching step to the other end of the bar to complete the forming of the tubular rivet.

The foregoing objects, advantages, features and results of the present invention, together with various other objects, advantages, features and results thereof which will be evident to those skilled in this art in the light of the present disclosure, may be attained with the exemplary embodiments of the invention which are illustrated in the accompanying drawings and which are described in detail hereinafter. Referring to the drawings:

FIGS. 1, 2, 3, 4 and 5 of the drawings illustrate successive steps of the method of the invention for manufacturing a tubular rivet of a blind rivet assembly;

FIG. 6 is a longitudinal sectional view of the tubular rivet;

FIG. 7 is an end elevational view of the tubular rivet, taken as indicated by the arrowed line 7—7 of FIG. 6;

FIG. 8 is a side elevational view of a complete blind rivet assembly incorporating the tubular rivet made in accordance with the invention;

FIGS. 9, 10, 11 and 12 are longitudinal sectional views illustrating successive steps in the setting of the blind rivet assembly illustrated in FIG. 8 of the drawings; and FIGS. 13, 14 and 15 are end elevational views respectively taken along the arrowed lines 13—13, 14—14 and 15—15 of FIGS. 9, 10 and 12, respectively, FIG. 13 being partially in section.

Referring first to FIG. 8 of the drawings, the completed blind rivet assembly is designated generally by the numeral 20 and includes a stem 22 having thereon a tubular rivet 24. The latter includes a sleeve 26 having a tail 28 and a head 30 at opposite ends thereof, a sealing washer 32 being carried by the sleeve 26 in engagement with the underside of the head 30 for installations in which a fluid-tight seal is required. The external surface of the sleeve 26 is provided with longitudinal fissures of grooves 34 therein which extend from the tail 28 toward the head 30. The tail 28 is provided with transverse notches 36 therein which form continuations of the respective grooves 34 and which extend from the external surface of the sleeve 26 to the internal surface thereon, as best shown in FIG. 6 of the drawings. As will become apparent, the purpose of the notches 36 is to facilitate initiation of splitting of the sleeve 26 into prongs along the grooves 34. The depth of the grooves 34 should not exceed approximately one-half the thickness of the sleeve 26. For example, for a sleeve thickness of 0.40 inch, the groove depth should be approximately 0.15 inch to 0.20 inch.

The stem 22 is provided at one end thereof with tail flaring means 38 adjacent and engageable with the tail 28 of the sleeve 26, the tail flaring means 38 comprising an enlargement 40 on the stem having a rounded, concave, annular surface 42 for tail flaring engagement with the internal surface of the sleeve 26 as will be described. The tail flaring means 38 terminates in an enlarged shank 44 which tapers into the body of the stem 22, as indicated at 46. Adjacent the enlarged shank 44 is a weakened zone or break neck 48 in the stem 22, this weakened zone preferably being formed by providing the stem with an annular groove therein. The stem 22 is provided, at the end thereof opposite the tail flaring means 38, with grippable means 50, the means 50 being engageable by a gripping means on the pulling member of a riveting tool to be described. While a particular form of grippable means 50 has been illustrated, it will be understood that other types of grippable means may be substituted therefor.

Considering now the method of the invention of manufacturing the tubular rivet 24, the starting material is preferably cylindrical bar stock 52, as shown in FIG. 1 of the drawings. The bar stock 52 may be of any suitable material, aluminum being an example. As shown in FIG. 2 of the drawings, a bar 54 is cut from the bar stock 52 as the next step in the method of the invention.

Referring to FIGS. 3 and 4 of the drawings, the bar 54 is placed between two relatively movable dies 56 and 58. In FIG. 3 of the drawings, the dies 56 and 58 are shown open without the bar 54 in place, and in FIG. 4, the dies are shown closed with the bar 54 in a partially processed condition. The die 56 is provided therein with a head-forming cavity 60 and the die 58 is provided therein with a cavity 62 for forming the exterior of the sleeve 26 of the tubular rivet 24, the cavity 62 being referred to as a sleeve-forming cavity for convenience. The upper die 56 is provided with a center punch 64 which projects into the head-forming cavity 60 in a direction axially of the sleeve-forming cavity 62, the diameter of the center punch 64 being somewhat less than the diameter of the sleeve-forming cavity. The peripheral wall of the sleeve-forming cavity 62 is provided with ribs 66, preferably four in number, for forming the grooves 34 in the external surface of the sleeve 26 and the transverse notches 36 in the tail 28 of the sleeve.

As will be apparent from inspection of FIGS. 3 and 4 of the drawings, when the bar 54 is placed between the dies 56 and 58 and these dies are closed, the grooves 34 and the notches 36 are formed first and then one end of the bar is upset to form a head 68 which approaches the final shape of the head 30. At the same time as the head 68 is formed, the center punch 64 forms an axial recess 70 in the upset head 68. Also, a center punch 72 on the die 58 projects axially into the sleeve-forming cavity 62 in alignment with the center punch 64 to form another axial recess 74. The effect of the center punches 64 and 72 is to compact the material of the bar 54 axially in a central zone of the bar from both ends of the bar, the result of this increase in the density of the central zone being discussed hereinafter.

Referring now to FIG. 5 of the drawings, the partly formed bar from the dies 56 and 58 is then placed in a die means comprising dies 76 and 78 to complete the external forming of the tubular rivet 24. The die 76 is provided therein with a head-forming cavity 80 conforming to the final configuration of the head 30 of the tubular rivet 24. The peripheral wall of a sleeve-receiving cavity 82 of the die 78 is provided with ribs 84 which correspond to the ribs 66 and which fit into the grooves 34 and the notches 36 in the sleeve 26. The cavity 82 is provided with a center punch 86 which is insertable into the previously formed recess 74 in the partially processed bar 54. The die 76 is provided with a center punch 88 which is insertable into the previously formed recess 70 and which projects axially through the head-forming cavity 80 into the cavity 82 when the dies 76 and 78 are closed. The center punch 88 deepens the previously formed recess 70 into a recess 90 which extends through the head 30 and therebeyond a substantial distance.

Upon closure of the dies 76 and 78, the bar 54 assumes the configuration illustrated in FIG. 5 of the drawings. The center punches 86 and 88 cooperate to further compact the material in a central zone therebetween to increase the density of the material in such zone for a purpose to be described.

Referring to FIG. 6 of the drawings, an axial bore 92 is drilled from the bottom of the recess 90 completely through the product resulting from closure of the dies 76 and 78 to form the finished tubular rivet 24. As a result of the compaction of the material of the bar 54 in a central zone thereof by the center punches 64 and 72 and by the center punches 86 and 88, the material of the final sleeve 26 will be denser adjacent the internal surface thereof than adjacent the external surface thereof. In other words, the density of the material forming the sleeve 26 increases radially from the external surface of the sleeve toward the internal surface thereof. Consequently, the material of the sleeve adjacent the internal surface thereof will be in a state of compression with respect to the material adjacent the external surface of the sleeve.

Referring now to FIG. 9 of the drawings, the blind rivet assembly 20 is inserted into registering holes 94 and 96 through elements 100 and 102 which are to be riveted together to form an assembly 104, FIGS. 11 and 12. When the rivet assembly 20 is thus inserted into the holes 94 and 96, the tail 28 of the tubular rivet 24 and the tail flaring means 38 and the enlarged shank 44 on the stem 22 are disposed on one side of the assembly 104, while the head 30 of the tubular rivet and the grippable means 50 on the stem are disposed on the opposite side of the assembly. The washer 32, if used, under the head 30 is engageable with one side of the assembly 104.

With the rivet assembly 20 inserted through the assembly 104 in the foregoing manner, a suitable riveting tool 106 is applied to the rivet assembly 20. More particularly, the riveting tool 106 is provided with a pressure member 108 adapted to seat on the head 30, and is provided with a pulling member 110 which is movable axially of the pressure member and which is provided with gripping means 112 for gripping the grippable means 50 on the stem 22 of the rivet assembly. The foregoing conditions obtaining, the pulling member 110 is moved axially of the pressure member 108 in a direction away from the assembly 104 to pull the stem 22 into the sleeve 26 of the tubular rivet 24.

Referring to FIG. 10, as the stem 22 is moved axially of the tubular rivet 24 to pull it into the sleeve 26, the enlarged shank 44 on the stem first expands the sleeve 26 to at least substantially fill the holes 94 and 96 through the assembly 104. As the tail flaring means 38 engages the tail 28 of the tubular rivet 24, the sleeve 26 of this rivet splits along the longitudinal grooves 34 in the external surface thereof to form prongs 114, initiation of the splitting action being facilitated by the notches 36 across the tail 28 of the rivet 24. As the tail flaring means 38 forms the prongs 114, it spreads them outwardly, as illustrated in FIGS. 10 and 11, these prongs curling outwardly, as shown in FIGS. 10, 11 and 12, as they are spread. This outward curling of the prongs 114 is due in part to the action of the concave surface 42 of the tail flaring enlargement 40, but, as will be explained hereinafter, is due primarily to the previously described compaction of the central zone of the bar 54 in the process of forming the tubular rivet 24. Ultimately, the tail flaring means 38 spreads the prongs 114 so that the outer ends thereof seat against one side of the assembly 104, as shown in FIG. 11, further axial movement of the stem 22 resulting in pressing the outer ends of the prongs 114 solidly against one side of the assembly 104 to provide a very high clamping or clinching force between the prongs and the head 30, which is an important feature of the invention.

Eventually, the resistance to axial movement of the stem 22 relative to the tubular rivet 24 reaches a value such that it exceeds the tensile strength of the weakened zone 48 of the stem 22, whereupon the stem breaks at such weakened zone as illustrated in FIG. 11 of the drawings.

After rupture of the stem 22 in the foregoing manner, the stem may be trimmed off flush with the head 30 of the tubular rivet 24, as shown in FIG. 12 of the drawings, to provide a finished appearance.

Considering in more detail the outward curling of the prongs 114, part of the outward curling thereof is, as previously suggested, due to the curling action provided by the concave tail flaring surface 42. However, the action of this surface is responsible for only a relatively small part of the outward curling of the prongs 114, the outward curling of these prongs being due primarily to the hereinbefore-described manner in which the tubular rivet 24 of the invention is formed. The outward curling of the prongs 114 results primarily from the compacting of the central zone of the bar 54 by means of the center punches 64 and 72 and the center punches 86 and 88 in the process of forming the bar 54 into the tubular rivet 24. What occurs during the formation of the bar 54 into the tubular rivet 24 in the hereinbefore-described manner is that the material of the sleeve 26 is compacted more adjacent the internal surface of the sleeve than adjacent the external surface thereof, the density of the material forming the sleeve thus increasing radially from the external surface of the sleeve toward the internal surface thereof, despite the fact that the most compacted central zone has been drilled out in forming the axial bore 92. Consequently, the material adjacent the internal surface of the sleeve 26 is in a state of axial compression relative to the material adjacent the external surface of the sleeve, or, in other words, the material adjacent the external surface of the sleeve is in a state of axial tension relative to the material adjacent the internal surface of the sleeve. Consequently, when the sleeve 26 is split into the prongs 114 at the notches 36 and along the longitudinal grooves 34, the stress differential between the interior and the exterior of the sleeve 26 is relieved, the inner surfaces of the prongs 114 expanding axially and the outer surfaces thereof contracting axially to cause the hereinbefore-described outward curling of the prongs.

Although I have disclosed herein an exemplary embodiment of my invention for purposes of illustration, it will be understood that various changes, modifications, and substitutions may be incorporated in such embodiment without departing from the spirit of the invention as defined by the claims which follow.

I claim:
1. A method of making a tubular rivet from a solid bar, including the steps of:
   (a) heading one end of said bar to form a head thereon;
   (b) simultaneously with said heading step centrally and longitudinally punching said bar at at least the other end thereof so as to provide said bar with a central longitudinal zone which is in a state of longitudinal compression relative to an annular longitudinal zone of said bar located radially outwardly of said central longitudinal zone thereof;
   (c) centrally and longitudinally holding said bar throughout its entire length to internal cross sectional dimensions which are substantially constant throughout the entire length of said bar and which constitute major portions of the corresponding external cross sectional dimensions of said bar between said other end of said bar and said head, whereby to form a radially thin sleeve having substantially constant radial thicknesses along longitudinal lines extending from said other end of said bar toward said head, the internal surface of said sleeve being in a state of longitudinal compression relative to the external surface thereof as the result of said punching and holing steps; and
   (d) simultaneously with said heading and punching steps weakening said bar along circumferentially spaced longitudinal lines extending from said other end of said bar toward said head, whereby to provide said sleeve with circumferentially spaced longitudinal lines of weakness along which said sleeve is longitudinally splittable, from the free end of said sleeve toward said head, into circumferentially spaced longitudinal prongs which tend to curl radially outwardly and then reversely toward said head as the longitudinal stress differentials between the inner and outer surfaces of the portions of said sleeve which form said prongs are relieved.

2. The method set forth in claim 1 wherein said holing step is a separate and independent step comprising centrally and longitudinally drilling said bar to a constant diameter throughout its entire length after completion of said heading, punching and weakening steps.

References Cited in the file of this patent

UNITED STATES PATENTS

| | | |
|---|---|---|
| 2,361,771 | Huck | Oct. 31, 1944 |
| 2,887,694 | Sauter | May 26, 1959 |